United States Patent
Mochizuki

(10) Patent No.: US 8,867,842 B2
(45) Date of Patent: Oct. 21, 2014

(54) IMAGE PROCESSING DEVICE PRODUCING A SINGLE-VIEWPOINT IMAGE BASED ON A PLURALITY OF IMAGES VIEWED FROM A PLURALITY OF VIEWING POINTS, IMAGE PROCESSING SYSTEM PRODUCING A SINGLE-VIEWPOINT IMAGE BASED ON A PLURALITY OF IMAGES VIEWED FROM A PLURALITY OF VIEWING POINTS, AND IMAGE PROCESSING METHOD PRODUCING A SINGLE-VIEWPOINT IMAGE BASED ON A PLURALITY OF IMAGES VIEWED FROM A PLURALITY OF VIEWING POINTS

(75) Inventor: Atsushi Mochizuki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 231 days.

(21) Appl. No.: 13/424,829

(22) Filed: Mar. 20, 2012

(65) Prior Publication Data

US 2013/0094763 A1 Apr. 18, 2013

(30) Foreign Application Priority Data

Oct. 12, 2011 (JP) ................. 2011-224525

(51) Int. Cl.
*G06K 9/48* (2006.01)
*H04N 19/00* (2014.01)
*G06K 9/36* (2006.01)
*G06T 5/50* (2006.01)
*H04N 19/597* (2014.01)
*H04N 19/85* (2014.01)

(52) U.S. Cl.
CPC ............. *G06K 9/36* (2013.01); *H04N 19/00* (2013.01); *G06K 9/48* (2013.01); *H04N 19/00769* (2013.01); *H04N 19/00903* (2013.01); *G06T 5/50* (2013.01); *G06T 2207/20221* (2013.01); *G06T 2207/10021* (2013.01)
USPC .......................................... 382/197

(58) Field of Classification Search
USPC .......................... 382/197; 357/240
See application file for complete search history.

(56) References Cited

U.S. PATENT DOCUMENTS

| | | | |
|---|---|---|---|
| 8,259,162 B2 * | 9/2012 | Kim et al. | 348/51 |
| 8,355,440 B2 * | 1/2013 | Qiu et al. | 375/240.16 |
| 2011/0135219 A1 | 6/2011 | Nguyen et al. | |
| 2011/0182363 A1 * | 7/2011 | Lin et al. | 375/240.25 |
| 2011/0188739 A1 * | 8/2011 | Lee et al. | 382/154 |
| 2012/0320983 A1 * | 12/2012 | Zheng et al. | 375/240.16 |
| 2012/0320986 A1 * | 12/2012 | Shimizu et al. | 375/240.16 |

FOREIGN PATENT DOCUMENTS

| | | | |
|---|---|---|---|
| JP | 2006-352261 | | 12/2006 |
| JP | 2006352261 A | * | 12/2006 |
| JP | 2010-283623 | | 12/2010 |

* cited by examiner

*Primary Examiner* — Stephen R Koziol
*Assistant Examiner* — Totam Le
(74) *Attorney, Agent, or Firm* — Knobbe, Martens, Olson & Bear, LLP

(57) ABSTRACT

According to one embodiment, an image processing system includes a decoder, a corresponding area detector and an image corrector. The decoder is configured to decode an input image signal obtained by encoding a plurality of images viewed from a plurality of viewing points different from each other, to generate a first image signal, a second image signal, and a motion vector for referring to the first image from the second image. The corresponding area detector is configured to detect a corresponding area in the second image, the corresponding area corresponding to a target block in the first image. The image corrector is configured to mix each pixel in the target block with each pixel in the corresponding area according to a degree of similarity between the target block and the corresponding area, to generate a third image signal.

21 Claims, 10 Drawing Sheets

IMAGE PROCESSING DEVICE PRODUCING A SINGLE-VIEWPOINT IMAGE BASED ON A PLURALITY OF IMAGES VIEWED FROM A PLURALITY OF VIEWING POINTS, IMAGE PROCESSING SYSTEM PRODUCING A SINGLE-VIEWPOINT IMAGE BASED ON A PLURALITY OF IMAGES VIEWED FROM A PLURALITY OF VIEWING POINTS, AND IMAGE PROCESSING METHOD PRODUCING A SINGLE-VIEWPOINT IMAGE BASED ON A PLURALITY OF IMAGES VIEWED FROM A PLURALITY OF VIEWING POINTS

CROSS REFERENCE TO RELATED APPLICATIONS

This application is based upon and claims the benefit of priority from the prior Japanese Patent Application No. 2011-224525, filed on Oct. 12, 2011, the entire contents of which are incorporated herein by reference.

FIELD

Embodiments described herein relate generally to an image processing device, an image processing system, and an image processing method.

BACKGROUND

Recently, stereoscopic display devices which display video images stereoscopically are becoming popular. In a stereoscopic display device, a plurality of moving pictures viewed from a plurality of viewpoints are displayed, for example, a moving picture for the right eye and a moving picture for the left eye. A viewer can see the displayed video image stereoscopically by viewing an image for right eye with the right eye and an image for left eye with the left eye.

Moving pictures for stereoscopic display can be encoded with H.264, which is one moving picture encoding standard. However, when encoding moving pictures for stereoscopic display, it is necessary to encode a plurality of moving pictures, and thus the encoding amount of the moving pictures have to be reduced compared to the case of encoding only moving pictures for two dimensional display. Therefore, if an encoded stereoscopic video image is decoded and displayed in two dimensions, there is a problem that the quality of the moving pictures decreases.

DETAILED DESCRIPTION

In general, according to one embodiment, an image processing system includes a decoder, a corresponding area detector and an image corrector. The decoder is configured to decode an input image signal obtained by encoding a plurality of images viewed from a plurality of viewing points different from each other, to generate a first image signal corresponding to a first image viewed from a first viewing point, a second image signal corresponding to a second image viewed from a second viewing point different from the first viewing point, and a motion vector for referring to the first image from the second image. The corresponding area detector is configured to detect a corresponding area in the second image, based on the first image signal, the second image signal, and the motion vector, the corresponding area corresponding to a target block in the first image. The image corrector is configured to mix each pixel in the target block with each pixel in the corresponding area according to a degree of similarity between the target block and the corresponding area, to generate a third image signal.

Embodiments will now be explained with reference to the accompanying drawings.

Figure 1:
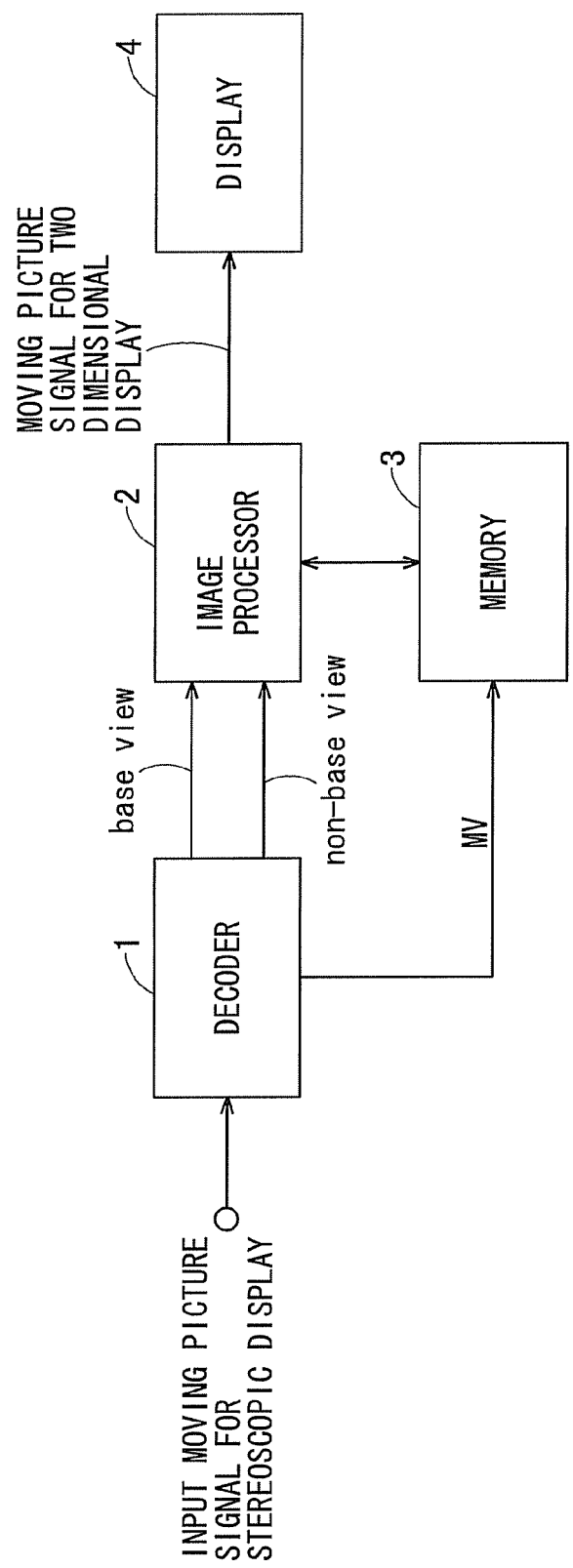
FIG. 1 is a schematic block diagram of an image processing system according to one embodiment.

FIG. 1 is a schematic block diagram of an image processing system according to one embodiment. The image processing system has a decoder 1, an image processor 2, a memory 3, and a display 4. In the image processing system of this embodiment, an input moving picture signal for stereoscopic display is inputted and then decoded and enhanced to generate a high quality moving picture signal for two dimensional display, which is then displayed. In the input moving picture signal, a plurality of moving pictures viewed from different viewpoints are encoded, and the present embodiment shows an example where an input moving picture signal, which is obtained by encoding a right-eye moving picture and a left-eye moving picture viewed from two viewpoints aligned in the horizontal direction, is inputted.

The decoder 1 decodes the input moving picture signal and generates a base view (a first image signal), a non-base view (a second image signal), and a motion vector (MV). The base view corresponds to, for example, a moving picture for the left eye. The non-base view is a moving picture encoded upon referring to the base view, and it corresponds to, for example, a moving picture for the right eye. The motion vector herein is a vector for referring to the base view from each block in the non-base view, with the non-base view as a reference. The base view and the non-base view are supplied to the image processor 2. Information relating to the motion vector is stored in the memory 3 using the blocks in the base view as an index.

The image processor 2 detects areas in the non-base view similar to each block in the base view as corresponding areas using the information relating to the motion vector stored in the memory 3. The image processor 2 then mixes each of the pixels included in the block in the base view and each of the pixels included in the corresponding area. Thereby, a moving picture signal (a third image signal) for two dimensional display in which the noise is reduced is generated. This moving picture signal is supplied to the display 4 and displayed as a two dimensional moving picture.

Figure 2:
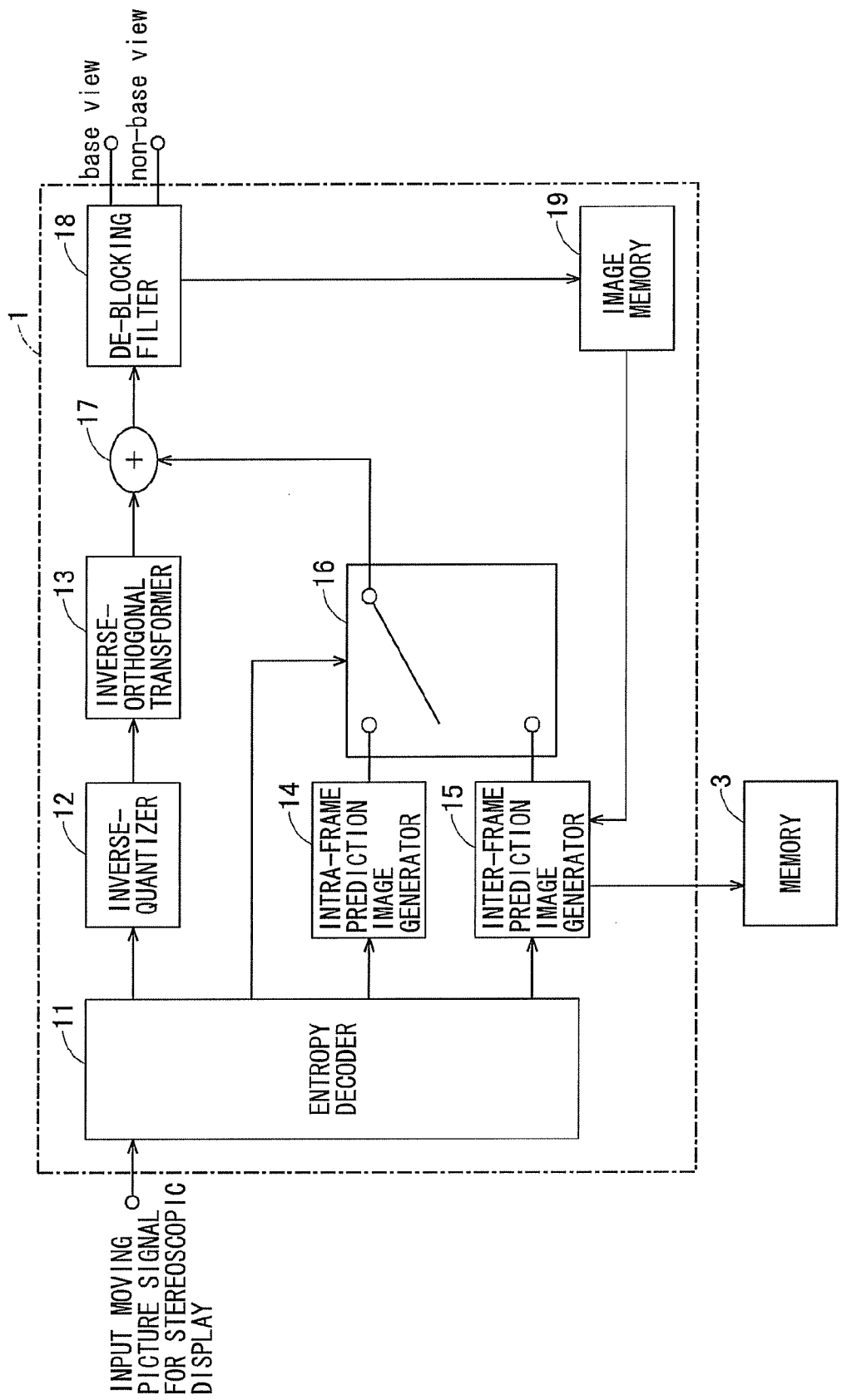
FIG. 2 is a schematic block diagram showing one example of the internal configuration of the decoder 1 and the memory 3.

FIG. 2 is a schematic block diagram showing one example of the internal configuration of the decoder 1 and the memory 3. The decoder 1 has an entropy decoder 11, an inverse-quantizer 12, an inverse-orthogonal transformer 13, an intra-frame prediction image generator 14, an inter-frame prediction image generator 15, a selector 16, an adder 17, a de-blocking filter 18, and an image memory 19.

The entropy decoder 11 performs variable length decoding on the input moving picture signal to generate a quantization DCT (Discrete Cosine Transform) coefficient, a quantization parameter, and decoding information. The decoding information is information indicating how the input moving picture signal has been encoded, and it includes a reference frame number, a motion vector, a prediction mode, and the like. The quantization DCT coefficient and the quantization parameter are supplied to the inverse-quantizer 12, the reference frame number and the motion vector are supplied to the inter-frame prediction image generator 15, and the prediction mode is supplied to the selector 16. The quantization DCT coefficient is also supplied to the intra-frame prediction image generator 14 and the inter-frame prediction image generator 15.

The inverse-quantizer 12 inverse-quantizes the quantization DCT coefficient based on the quantization parameter to generate a DCT coefficient. The DCT coefficient is supplied to the inverse-orthogonal transformer 13. The inverse-orthogonal transformer 13 performs inverse-DCT transform on the DCT coefficient to generate a residual signal. The residual signal is supplied to the adder 17.

The intra-frame prediction image generator 14 generates an intra-frame prediction image based on the quantization DCT coefficient. The intra-frame prediction image is supplied to the selector 16.

The inter-frame prediction image generator 15 generates an inter-frame prediction image and information relating to the motion vector using the quantization DCT coefficient, a decoded frame image stored in the image memory 19, the reference frame number, and the motion vector. The inter-frame prediction image is supplied to the selector 16. The information relating to the motion vector is stored in the memory 3.

The selector 16 selects the intra-frame prediction image or the inter-frame prediction image in accordance with the prediction mode and supplies the selected one to the adder 17. More specifically, the selector 16 selects the intra-frame prediction image when a decoding target block is intra-frame encoded and selects the inter-frame prediction image when the decoding target block is inter-frame-encoded.

The adder 17 adds the selected prediction image and the residual signal to generate a frame image. The frame image is supplied to the de-blocking filter 18.

The de-blocking filter 18 performs processing to improve distortion between blocks on the frame image to generate the base view and the non-base view. These views are supplied to the image processor 2 and stored in the image memory 19.

Figure 3:
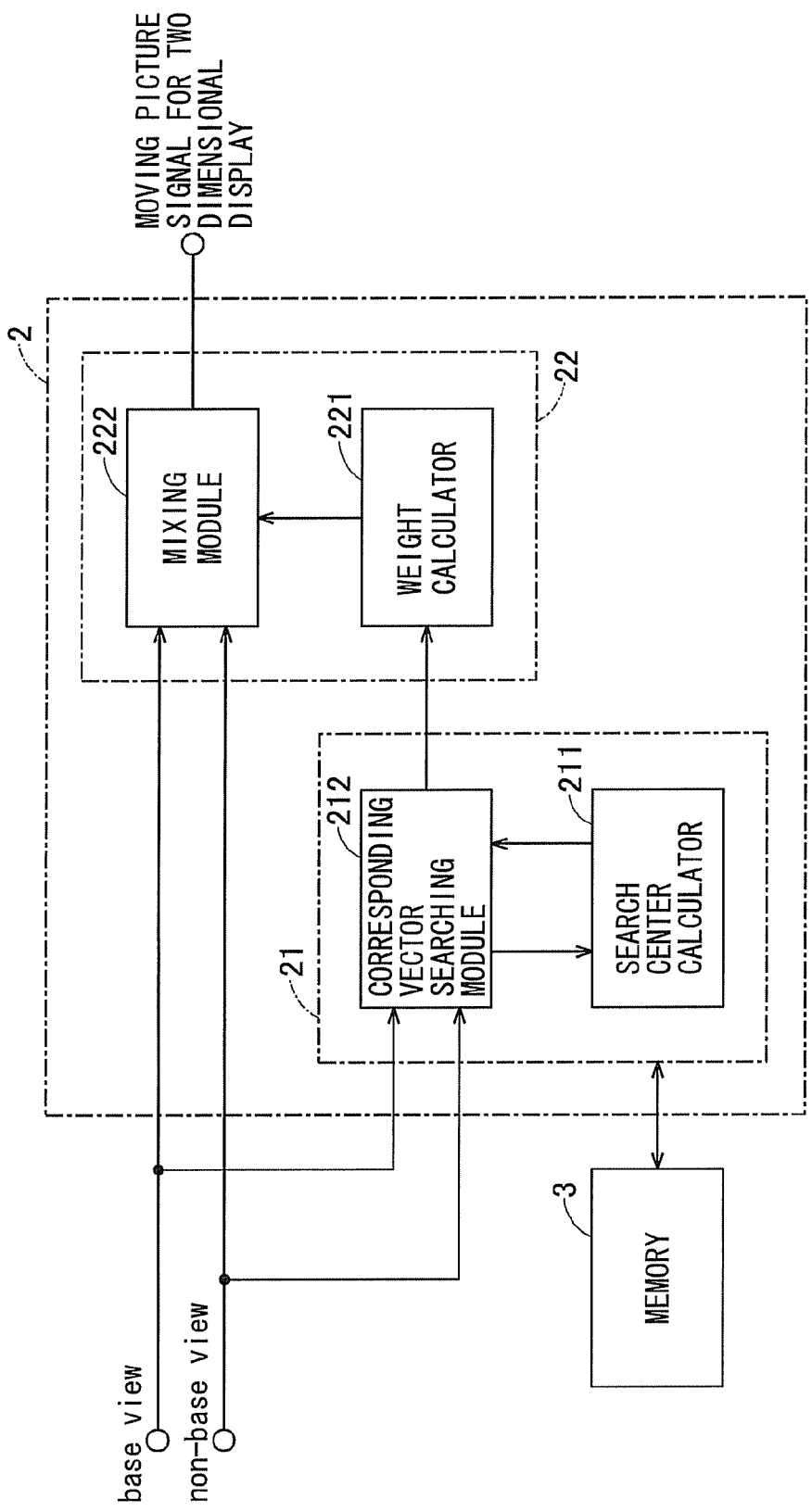
FIG. 3 is a schematic block diagram showing one example of the internal configuration of the image processor 2 and the memory 3.

FIG. 3 is a schematic block diagram showing one example of the internal configuration of the image processor 2 and the memory 3. The image processor 2 has a corresponding area detector 21 and an image corrector 22. The corresponding area detector 21 has a search center calculator 211 and a corresponding vector searching module 212. The image corrector 22 has a weight calculator 221 and a mixing module 222. The image processor 2 performs detection processing of corresponding areas and correction processing using a block in the base view as a unit.

The corresponding area detector 21 detects a corresponding area in the non-base view similar to a processing-targeted block (hereinafter, referred to as a target block) in the base view based on the information relating to the motion vector stored in the memory 3. In further detail, the search center calculator 211 generates a search center vector for the target block based on the information relating to the motion vector. The search center vector indicates the center position of an area over which the search for the corresponding area will be performed with the non-base view, and also indicates the approximate position of the corresponding area. The corresponding vector searching module 212 searches for an area which is the most similar to the target block in the predetermined search area centered on the position shown by the search center vector and deems this area as the corresponding area. Subsequently, a corresponding vector and a degree of similarity are supplied to the image corrector 22, the corresponding vector indicating the positional relationship between the target block and the corresponding area and the degree of similarity indicating the degree to which the target block and the corresponding area are similar.

The image corrector 22 mixes the target block and the corresponding area shown by the corresponding vector in accordance with their degree of similarity. More specifically, the weight calculator 221 calculates the weight from the degree of similarity between the target block and the corresponding area. The mixing module 222 mixes the pixels in the target block with the corresponding pixels in the corresponding area in accordance with the weight.

Figure 4:
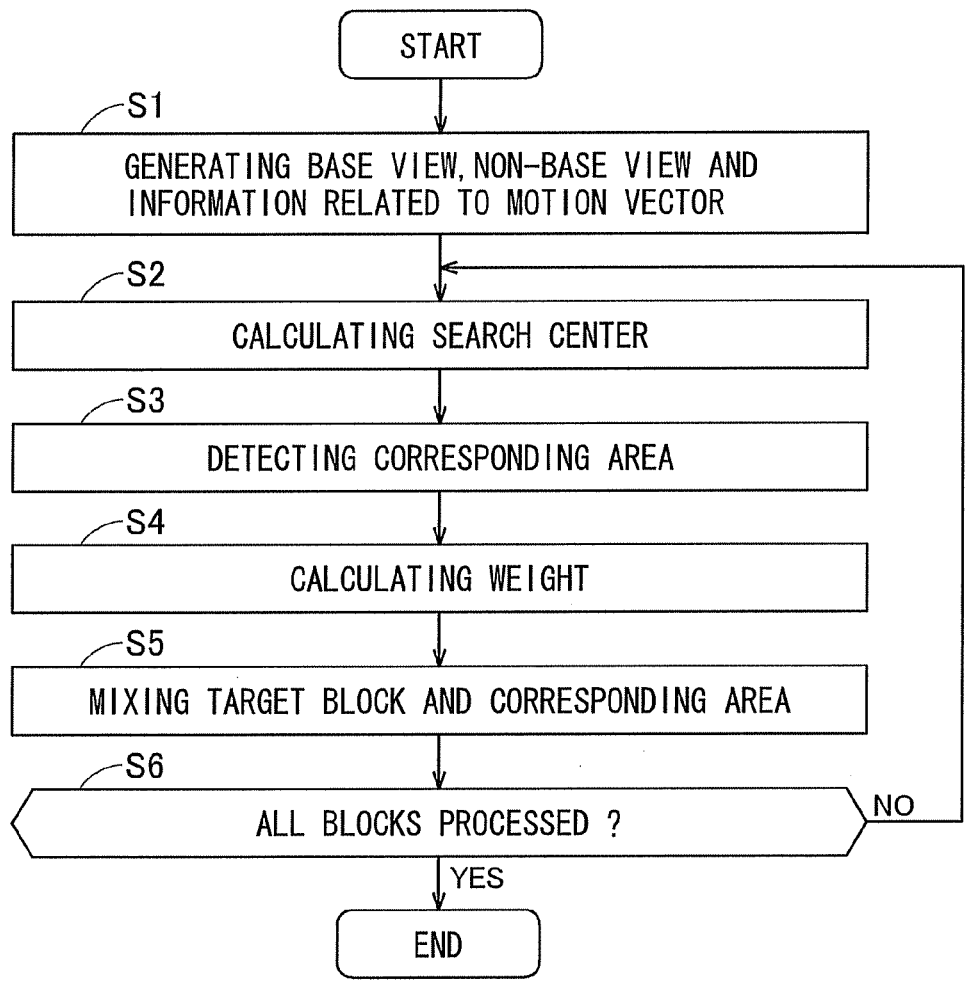
FIG. 4 is a flowchart showing an outline of the processing operation of the image processing system.

Next, the processing operations of the image processing system shown in FIGS. 1 to 3 will be explained. FIG. 4 is a flowchart showing an outline of the processing operation of the image processing system.

First, the decoder 1 decodes the input moving picture image signal to generate a base view, a non-base view, and a motion vector. The inter-frame prediction image generator 15 generates information relating to the motion vector based on the generated motion vector and stores it in the memory 3 (S1). This process is carried out in frame units, not block units. On the other hand, the following processes are carried out in block units.

The search center calculator 211 calculates a search center vector of a target block in the base view based on the information relating to the motion vector stored in the memory 3 and the corresponding vector, and calculates a search center in a search area in the non-base view (S2).

The corresponding vector searching module 212 then searches for an area which is the most similar to the target block in the predetermined search area centered on the search center and deems this area to be the corresponding area (S3). A corresponding vector indicative of the corresponding area is stored in the memory 3 by each target block, and is used for calculating the search center vector of other target blocks.

The weight calculator 221 calculates the weight from the degree of similarity between the target block and the corresponding area (S4). Next, the mixing module 222 mixes the pixels in the target block and the corresponding pixels in the corresponding area in accordance with the weight (S5).

The processes of steps S2 to S5 above are carried out for all of the blocks in the frame (S6) to generate a moving picture for two dimensional display for one frame.

Next, the processes of FIG. 4 will be explained in further detail.

Figure 5:
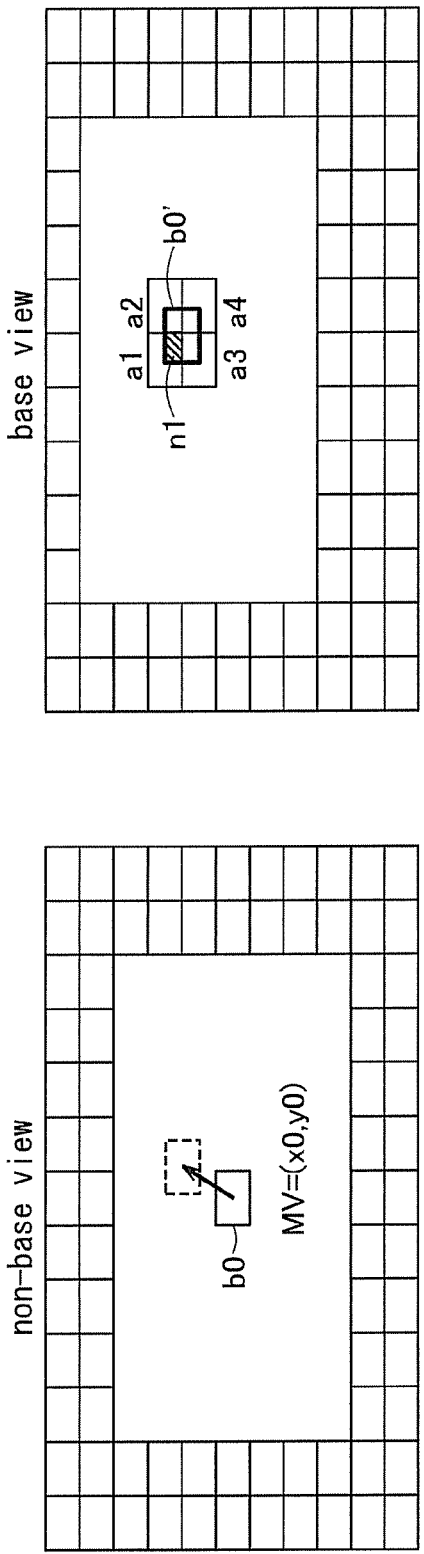
FIGS. 5A and 5B are diagrams for explaining step S1.

FIGS. 5A and 5B are diagrams for explaining step S1. A motion vector is generated by performing entropy decoding on the input moving picture signal. The motion vector is a vector whose start point is a block in the non-base view and whose end point is an area in the base view which is referred to by the block. In the example of FIG. 5A, the motion vector of block b0 in the non-base view is MV (x0, y0). The area b0' in the base view is referred to from the block b0 in the non-base view by the motion vector MV. The area b0' does not necessarily match the block in the base view, and in the example of FIG. 5A, it straddles across blocks a1 to a4.

As shown in FIG. 5B, in the memory 3, a motion vector facing each block and an estimated value are stored using the blocks in the base view as an index. For example, when the number of pixels of the input moving picture signal is 1920*1088 and the number of pixels in each block is 16*16, (1920*1088)/(16*16)=8160 indexes exist in the memory 3.

In the example of FIGS. 5A and 5B, since the blocks a1 to a4 are all end points of the motion vector MV, MV (x0, y0) is stored as the motion vector of the blocks a1 to a4. The number of pixels of each of the blocks a1 to a4 and the area b0' that overlap each other is the estimated value. For example, if n1 pixels among the block a1 and the area b0' overlap each other, then n1 is stored as the estimated value of the block a1. A larger estimated value means that the block in the base view and the block in the non-base view which is the start point of the stored motion vector are more similar to each other.

Some blocks in the base view may not be referred to from any of the blocks in the non-base view. A motion vector is not stored for these blocks, and the estimated value of these blocks is 0.

On the other hand, some blocks in the base view may be referred to from a plurality of blocks in the non-base view. In this case, only the motion vector with a higher estimated value and the estimated value thereof are stored. This is because a higher estimated value means that the block in the base view and the block in the non-base view are more similar. Further, in the case where the estimated values are the same, the block with smaller absolute value of the vertical component of the motion vector and the estimated value thereof are preferentially set. This is because the eyes of a human being are spaced from each other in only an approximately horizontal direction, and thus in the base view and the non-base view for stereoscopic display, blocks similar to each other often exist in the horizontal direction.

As described above, the information relating to the motion vector for one frame is stored in the memory 3. In the memory 3, a corresponding vector (to be explained later) is also stored using the blocks in the base view as indexes. Next, the search center calculator 211 calculates the search center vector indicative of the search center for the target block in the base view as described below (step S2 in FIG. 4).

Figure 6:
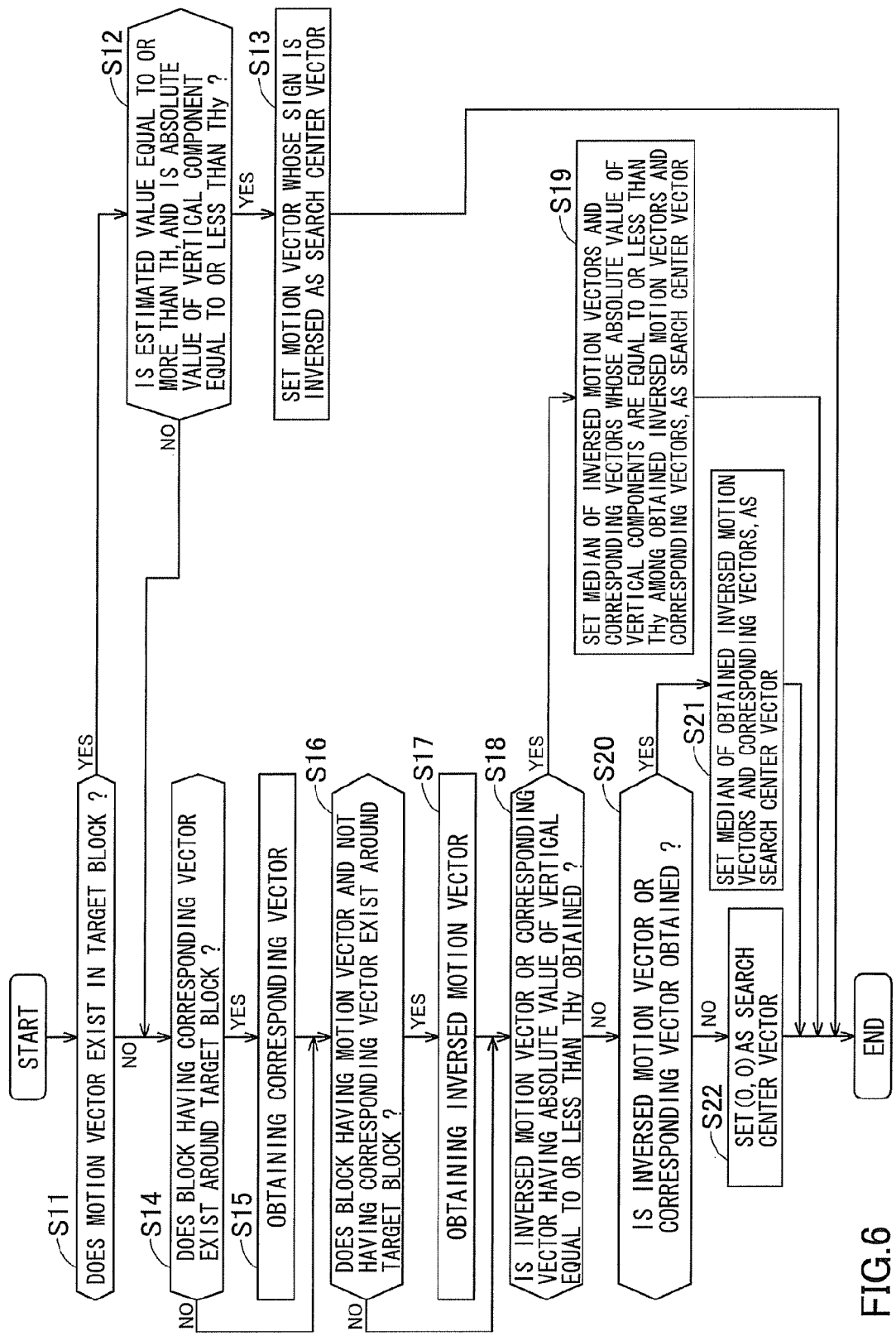
FIG. 6 is a flowchart showing step S2 of FIG. 4 in more detail.

FIG. 6 is a flowchart showing step S2 of FIG. 4 in more detail.

When the target block is referred to from one of the blocks in the non-base view and the motion vector is stored in the index of the target block in the memory 3 (YES in S11), and the estimated value of the motion vector is equal to or more than a threshold value TH and the absolute value of the vertical component thereof is equal to or less than a threshold value THy (YES in S12), the search center calculator 211 generates the search center vector by inversing the motion vector (S13). The reason for setting the threshold values TH and THy is that a search center vector is set only when there is a motion vector whose reliability is relatively high. Here, the threshold values TH and THy are arbitrary values.

On the other hand, when the target block is not referred to from any of the blocks in the non-base view and the motion vector is not stored in the index of the target block in the memory 3 (NO in S11), and even when the motion vector is stored, if the estimated value is equal to or less than the threshold value TH or the absolute value of the vertical component is equal to or less than the threshold value THy (NO in S12), a corresponding vector and a motion vector of a block around the target block are used to calculate to the search center vector.

If there is a block around the target block on which the processing of step S3 has already been performed and for which a corresponding vector is stored in the memory 3 (YES in S14), the search center calculator 211 obtains all of the corresponding vectors for the blocks around the target block (S15). A block around the target block on which the processing of step S3 has already been performed is, for example, the block to the top left, the top, the top right, and the left of the target block when processing the frame from the top left to the bottom right in raster scan order.

Even if a corresponding vector around the corresponding area is not stored, if a block for which a motion vector is stored exists around the target block (YES in S16), the search center calculator 211 obtains the motion vector of the block around the target block upon inversing its sign (S17). Hereinafter, a motion vector whose sign is inversed will be referred to as an inversed motion vector. It should be noted that the "block around the target block" in step S16 is not necessarily one on which the processing of step S3 has already been performed.

Among the corresponding vectors and the inversed motion vectors obtained in steps S15 and S17, if a vector whose absolute value of the vertical component is equal to or less than the threshold value THy has been obtained (YES in S18), a vector having the median of the horizontal components of these vectors and the median of the vertical components thereof is set as the search center vector (S19). The reason that the median rather than the average or the like is used is to suppress the influence of vectors greatly different from other vectors.

Among the corresponding vectors and the inversed motion vectors obtained in steps S15 and S17, if a vector whose absolute value of the vertical component is equal to or less than the threshold value THy has not been obtained (NO in S18), if at least one inversed motion vector or corresponding vector has been obtained (YES in S20), a vector having the median of the horizontal components of these vectors and the median of the vertical component thereof is set as the search center vector (S21).

If no corresponding vectors or inversed motion vectors have been obtained at all in steps S15 and S17 (NO in S20), (0, 0) is set as the search center vector (S22).

Once a search center vector of the target block is generated as described above, next, the corresponding vector searching module 212 searches for the corresponding vector of the target block and detects the corresponding area (S3 in FIG. 4).

Figure 7:
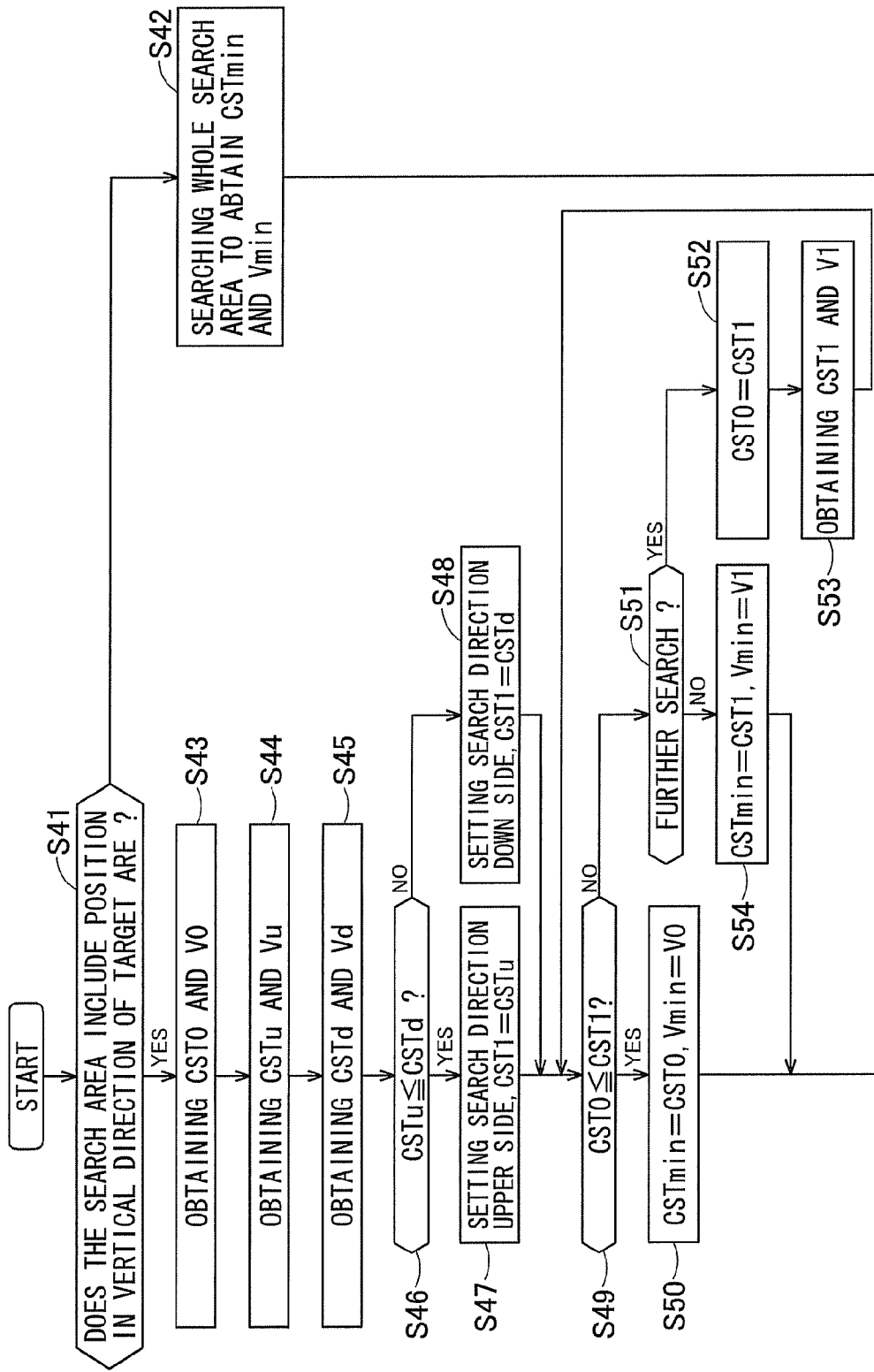
FIG. 7 is a flowchart showing step S3 of FIG. 4 in more detail.

FIG. 7 is a flowchart showing step S3 of FIG. 4 in more detail.

First, the corresponding vector searching module 212 determines whether or not a position in the vertical direction which is identical to the target block is included in the search area set in the non-base view (S41). This process will be explained in more detail below.

Figure 8A:
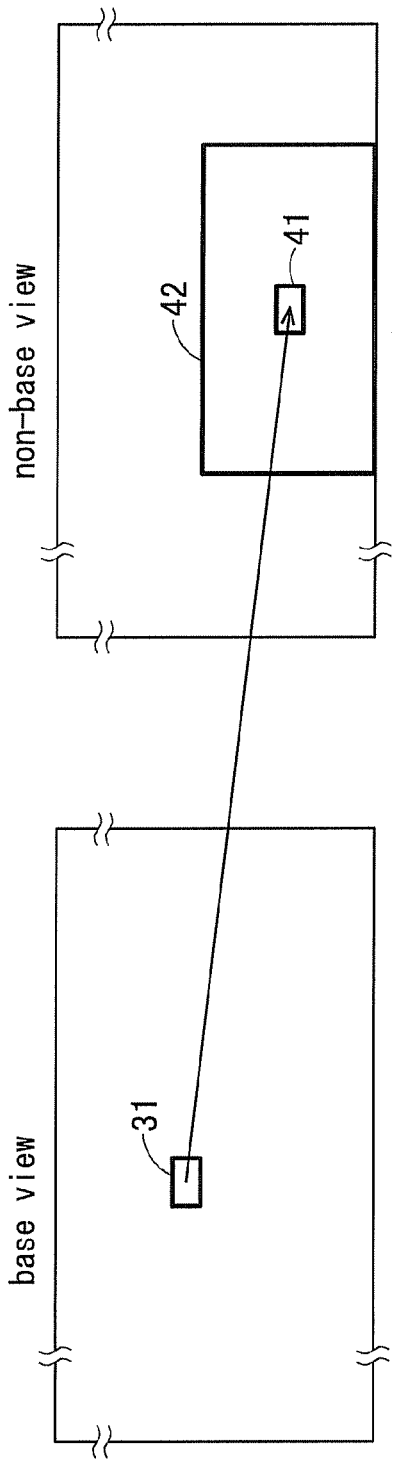
FIGS. 8A and 8B are diagrams showing one example of a search area.
Figure 8B:
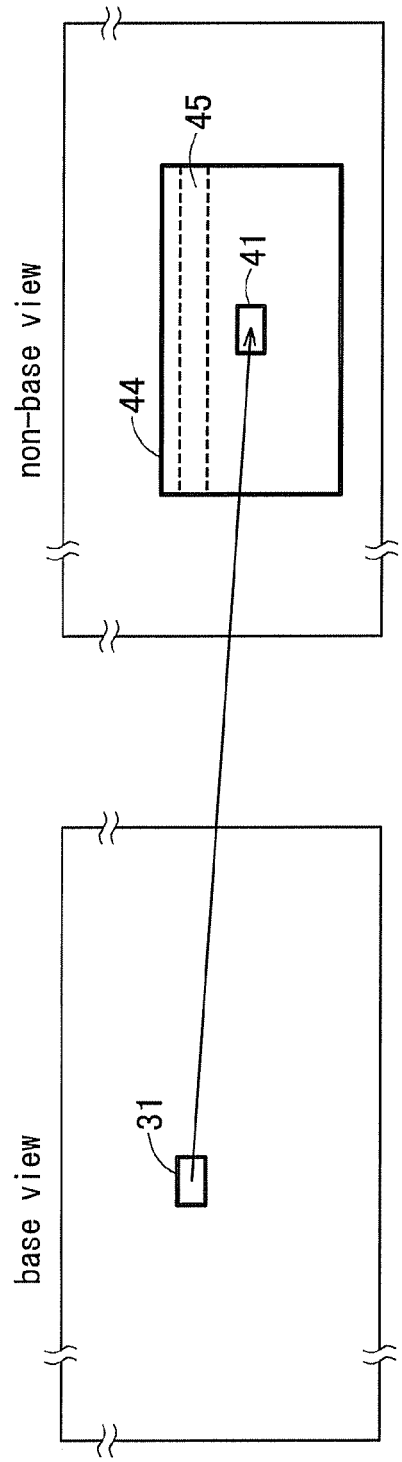

FIGS. 8A and 8B are diagrams showing one example of a search area. For example, as shown in FIG. 8A, an area in the non-base view referred to from a target block 31 in the base view by the search center vector is set as a search center 41. Next, a predetermined area centered on the search center 41 is set as a search area 42. The search area includes, for example, 8 pixels above the search center and 8 pixels therebelow in the vertical direction, and 32 pixels to the left of the search center and 32 pixels to the right thereof in the horizontal direction.

Normally, a moving picture for stereoscopic display includes a plurality of moving pictures viewed from a plurality of viewpoints aligned in the horizontal direction, and thus it is preferable to set the search area to be horizontally long.

FIG. 8A is an example where the position in the vertical direction of the target block 31 is not included in the search area 42 (NO in S41). On the other hand, FIG. 8B is an example where the position in the vertical direction of the target block 31 is included in the search area 42 (YES in S41).

As shown in FIG. 8A, if the position in the vertical direction of the target block 31 is not included in the search area 42 (NO in S41), the corresponding vector searching module 212 searches the entire search area 42 to detect a corresponding area that is the most similar to the target block 31 (S42). The corresponding area does not necessarily have to align with the block in the non-base view, but it has the same pixel size as the block. Below, areas in the search area 42 having the same pixel size as that of the block in the base view will be referred to as block areas. The block areas can be set so that they do not overlap each other, but the block areas in the present embodiment are set to partially overlap each other. Thereby, a detailed search for a corresponding vector can be carried out.

More specifically, the corresponding vector searching module 212 calculates a cost CST indicative of the degree of similarity between the target block 31 and each block area. The cost CST is, for example, the sum of absolute difference of the pixel value in the target block 31 and the pixel value in the block area, and it is represented by formula (1) below.

$$CST = \sum_{x,y \in block} |S(x, y) - A(x, y)| \quad (1)$$

Here, A (x,y) is the pixel value of coordinates (x,y) in the target block, and S (x,y) is the pixel value of coordinates relatively corresponding to coordinates (x,y) in the block area. The above formula (1) indicates the accumulated value of the absolute difference of both pixel values in the block. The coordinates (x,y) are, for example, coordinates originating at the top left pixel in the target block and the block area. As the cost, other than the sum of absolute difference, for example, the sum of the absolute values of the DCT value of the difference of both pixel values or the like can also be used. A smaller cost means that the target block 31 and the block area are more similar.

The cost CST is calculated for all of the block areas in the search area 42, and the block area whose cost is the smallest is the corresponding area that is most similar to the target block. Therein, the smallest cost CST is obtained as a smallest cost CSTmin, and the vector indicative of the positional relationship between the block area whose cost is the smallest (corresponding area) and the target block is obtained as a corresponding vector Vmin. The corresponding vector Vmin is a vector whose start point is the target block and whose end point is the corresponding area.

On the other hand, as shown in FIG. 8B, if a position in the vertical direction which is the same as the target block 31 is included in the search area 44 (YES in S41), a line in the horizontal direction including this position in the vertical direction is set as a reference line 45. Next, a search for the corresponding vector is started from the reference line 45.

The corresponding vector searching module 212 calculates the cost CST for each block area on the reference line 45. The smallest cost CST is obtained as a cost CST0, and the vector indicative of the positional relationship between the block area whose cost is the smallest and the target block is obtained as a vector V0 (S43).

The corresponding vector searching module 212 calculates the cost CST for each block area on the line that is over the reference line 45. The smallest cost CST is obtained as a cost CSTu, and the vector indicative of the positional relationship between the block area whose cost is the smallest and the target block is obtained as a vector Vu (S44). Here, the line that is over the reference line 45 refers to, for example, a line that is one pixel above the reference line 45 in the vertical direction.

Similarly, the corresponding vector searching module 212 calculates the cost CST for each block area on the line that is under the reference line 45. The smallest cost CST is obtained as a cost CSTd, and the vector showing the positional relationship between the block area whose cost is the smallest and the target block is obtained as a vector Vd (S45).

Figure 9:
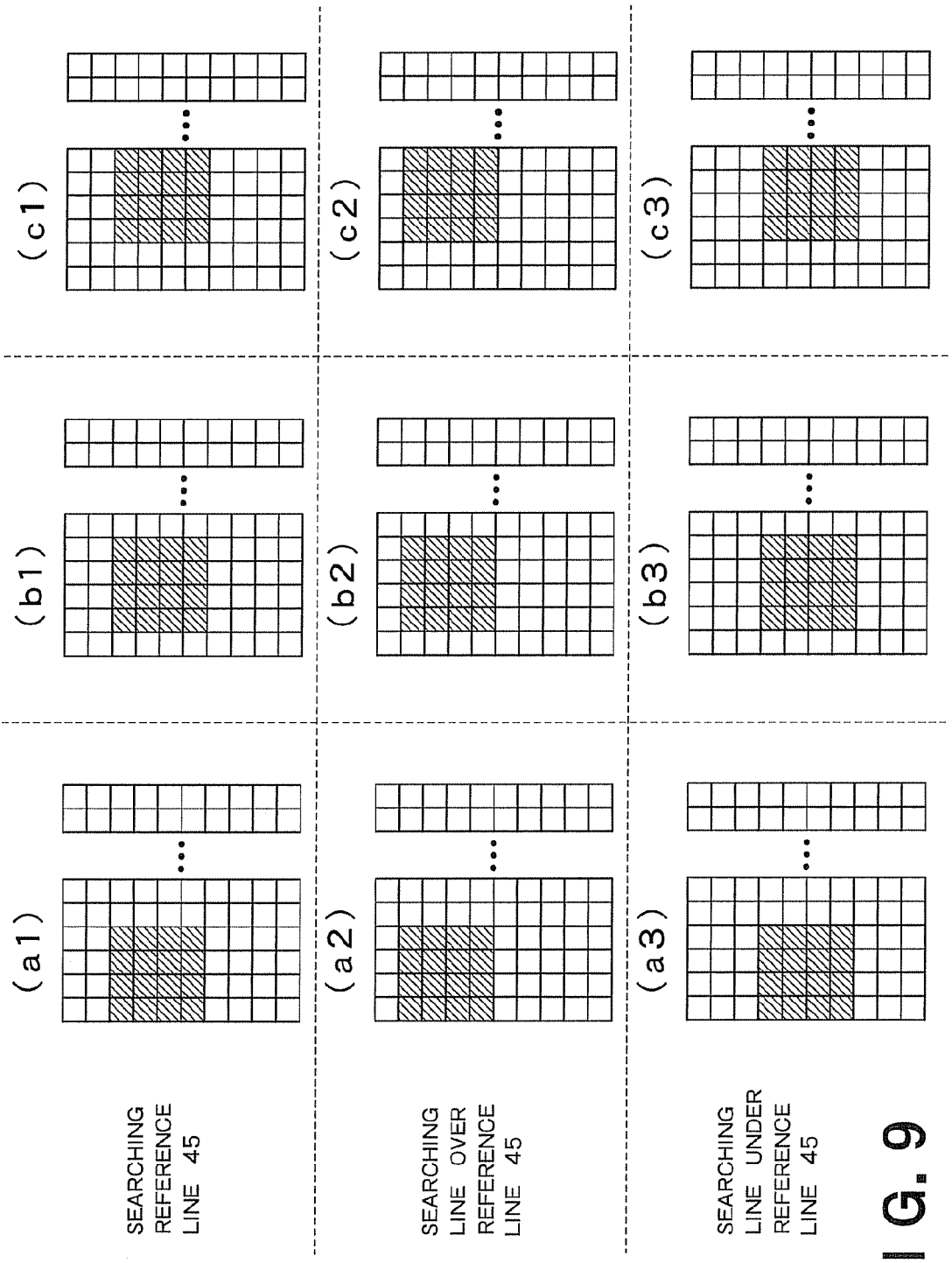
FIG. 9 is a diagram for explaining the corresponding vector search of steps S43 to S45.

FIG. 9 is a diagram for explaining the corresponding vector search of steps S43 to S45. It should be noted that FIG. 9 shows an example in which the block area consists of 4*4 pixels.

In step S43, first, the corresponding vector searching module 212 calculates the cost CST for the block area on the left end of the reference line 45 (FIG. 9(a1)). Next, the corresponding vector searching module 212 calculates the cost CST for the block area at a position that is displaced by one pixel to the right side in the horizontal direction (FIG. 9(b1)). Thereafter, in the same way, the corresponding vector searching module 212 searches for the block area having the smallest cost CST while displacing the block area by one pixel at a time in the horizontal direction (FIG. 9(c1)), to obtain the smallest cost CST0 and vector V0.

In step S44, the corresponding vector searching module 212 calculates the cost CST for the block area on the left end of the line which is one pixel above the reference line 45 in the vertical direction (FIG. 9(a2)). Thereafter, in the same manner as in step S43, the corresponding vector searching module 212 searches for the block area having the smallest cost CST on the line above the reference line 45 to obtain the smallest cost CSTu and vector Vu. Further, in step S45, as shown in FIGS. 9(a3), (b3), and (c3), the corresponding vector searching module 212 searches for the block area having the smallest cost CST on the line which is one pixel below the reference line 45 in the vertical direction to obtain the smallest cost CSTd and vector Vd.

If CSTu≤CSTd (YES in S46 of FIG. 7), the searching direction is set to upward and CST1=CSTu is set (S47).

On the other hand, if CSTu>CSTd (NO in S46), the searching direction is set to downward and CST1=CSTd is set (S48).

If CST0≤CST1 (YES in S49), or in other words, if the smallest cost in the reference line 45 is local minimum, the corresponding vector searching module 212 obtains the smallest cost CSTmin and corresponding vector Vmin (S50), and thereby this process is completed.

On the other hand, if CST0>CST1 (NO in S49), or in other words, if the smallest cost in the reference line 45 is not local minimum, the corresponding vector searching module 212 determines whether or not to perform a further search (S51). In other words, if the searching direction is set to upwards, the corresponding vector searching module 212 determines whether or not the line above the line on which the cost CST has been calculated is in the search area, and if the searching direction is set to downwards, the corresponding vector searching module 212 determines whether or not the line below the line on which the cost CST has been calculated is in the search area.

If a further search is to be performed (YES in S51), the cost CST1 is set to the cost CST0 and the vector V1 is set to the vector V0 (S52). If the searching direction is set to upwards, the cost CST is calculated for each block area on the line which is one more above, and the smallest cost CST is obtained as CST1, and the vector indicative of the positional relationship between the block area whose cost is the smallest and the target block is obtained as the vector V1 (S53). The processing of steps S49 and thereafter are then repeated. During repeating these steps, if CST0≤CST1 (YES in S49), or in other words, if a local minimum cost is obtained, the smallest cost CSTmin and corresponding vector Vmin are obtained (S50), and thereby the process is completed.

On the other hand, if the processing of steps S49 and thereafter are repeated and the cost CST0 does not become local minimum even upon calculating the costs of the uppermost (or lowermost) line in the search area, or in other words, if CST0≤CST1 (YES in S49) is not reached, a search beyond the search area is not carried out (NO in S51) and the cost CST1 on the uppermost (or lowermost) line in the search area is obtained as the smallest cost CSTmin and the vector V1 is obtained as the corresponding vector Vmin (S54), and thereby the process is completed.

It should be noted that the corresponding vector Vmin obtained in steps S42, S50, and S54 is stored in the memory 3 (FIG. 5B), and used for calculating the search center of a subsequent target block.

Figure 10A:
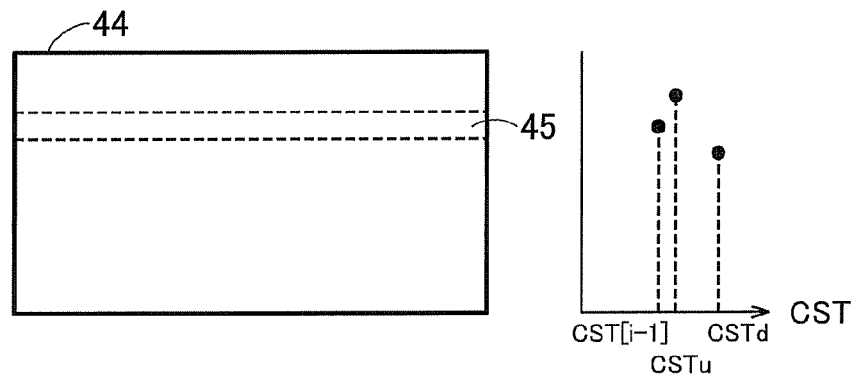
FIGS. 10A and 10B are diagrams showing the search area 44 and the smallest cost on each line.
Figure 10B:
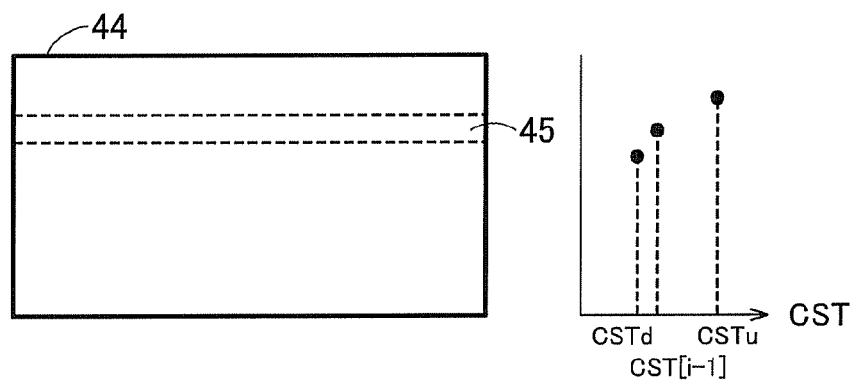

A specific example of the processing of steps S46 and thereafter will now be explained. FIGS. 10A and 10B are diagrams showing the search area 44 and the smallest cost on each line.

In the example of FIG. 10A, CST0<CSTu<CSTd. Since CSTu<CSTd (YES in S46), CST1=CSTu is set (S47). Next, since CST0≤CST1 (=CSTu) is satisfied (YES in S49), the cost on the reference line 45 is local minimum, and the smallest cost CSTmin and corresponding vector Vmin are obtained (S50).

On the other hand, in the example of FIG. 10B, CSTd<CST0<CSTu. Since CSTd<CSTu (NO in S46), CST1=CSTd is set and the searching direction is set to downwards (S48). Here, since CST1 (=CSTd)<CST0 (NO in S49), hereinafter the block area in which the cost CST becomes local minimum is searched in the downward direction (S49 to S54).

A moving picture for stereoscopic display is normally a moving picture from a plurality of viewpoints aligned in the horizontal direction. Therefore, a corresponding area that is similar to the target block is highly likely to exist at a position displaced in the horizontal direction from the target block. In the present embodiment, since the search of the block areas is initiated from the reference line which includes the position in the vertical direction which is the same as the target block, the corresponding vector can be obtained quickly. Further, since the corresponding vector is determined when the cost becomes local minimum and then the search is completed, the amount of processing can be reduced.

As described above, when the corresponding area is detected, then, the weight calculator 221 calculates the weight for mixing the target block and the corresponding area (S4 in FIG. 4).

Figure 11:
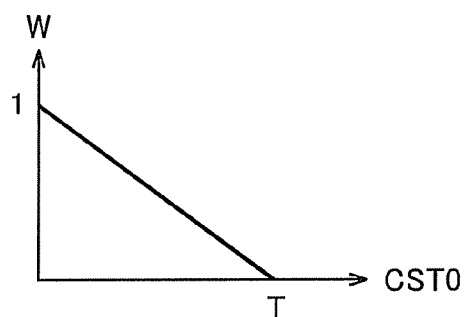
FIG. 11 is a diagram showing an example of the relationship between the smallest cost CSTmin calculated in step S3 and the weight W.

FIG. 11 is a diagram showing an example of the relationship between the smallest cost CSTmin calculated in step S3 and the weight W. As shown in FIG. 11, the weight calculator 221 calculates the weight W based on the following formula (2).

$$W = (-1/T) * CST\text{min} + 1 \quad (\text{if } CST\text{min} < T) \quad (2)$$
$$0 \quad (\text{else } (CST\text{min} \geq T))$$

Here, T is a predetermined constant. FIG. 11 and the above formula (2) are only one example. As the smallest cost CST is smaller (that is, as the degree of similarity is larger), the weight calculator 221 sets the weight W larger. Note that the weight W can also be calculated using other functions or predetermined tables.

Next, the mixing module 222 mixes each of the pixels in the target block and each of the pixels in the corresponding area in accordance with the weight W (S5 in FIG. 4). More specifically, the mixing module 222 mixes the pixels together based on, for example, the following formula (3).

$$r = (p + W*q)/(1+W) \quad (3)$$

Here, p is the pixel value in the target block, and q is the pixel value in the corresponding area. r is the pixel value in the moving picture signal after mixing, and is the pixel value in the moving picture for two dimensional display which is the output of the image processor 2. Each of the pixels in the corresponding area which is to be mixed with each of the pixels in the target block is shown by the corresponding vector. By carrying out this kind of mixing, the noise can be reduced.

By carrying out the processing of FIG. 4 described above, the moving picture signal for two dimensional display is generated.

In this way, in the present embodiment, the area in the non-base block that is similar to the blocks in the base view is detected, and the base view and the non-base view are mixed. Therefore, a moving picture for two dimensional display having high quality and reduced noise can be generated.

At least a part of the image processing system explained in the above embodiments can be formed of hardware or software. When the image processing system is partially formed of the software, it is possible to store a program implementing at least a partial function of the image processing system in a recording medium such as a flexible disc, CD-ROM, etc. and to execute the program by making a computer read the program. The recording medium is not limited to a removable medium such as a magnetic disk, optical disk, etc., and can be a fixed-type recording medium such as a hard disk device, memory, etc.

Further, a program realizing at least a partial function of the image processing system can be distributed through a communication line (including radio communication) such as the Internet etc. Furthermore, the program which is encrypted, modulated, or compressed can be distributed through a wired line or a radio link such as the Internet etc. or through the recording medium storing the program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

The invention claimed is:

1. An image processing system comprising:
   a decoder configured to decode an input image signal obtained by encoding a plurality of images viewed from a plurality of viewing points different from each other, to generate a first image signal corresponding to a first image viewed from a first viewing point, a second image signal corresponding to a second image viewed from a second viewing point different from the first viewing point, and a motion vector for referring to the first image from the second image;
   a corresponding area detector configured to detect a corresponding area in the second image, based on the first image signal, the second image signal, and the motion vector, wherein the corresponding area in the second image corresponds to a target block in the first image, a corresponding vector indicating the corresponding area of a block around the target block, and to calculate a search center vector for the target block indicative of a search center of an area over which the corresponding area is searched; and
   an image corrector configured to mix each pixel in the target block with each pixel in the corresponding area according to a degree of similarity between the target block and the corresponding area, to generate a third image signal.

2. The system of claim 1, wherein the corresponding area detector comprises:
   a search center calculator configured to calculate a search center indicative of a search center of an area over which the corresponding area is searched based on the motion vector; and
   corresponding vector searching module configured to search the corresponding area in a search area whose center is the search center.

3. The system of claim 2, wherein the search center calculator is configured to calculate the search center based on at least a part of the motion vector relating to the target block, the motion vector relating to a block around the target block, and the corresponding vector.

4. The system of claim 2, wherein the corresponding vector searching module is configured to calculate a cost indicative of a degree of similarity between the target block and a block area comprising a plurality of pixels in the search area, and to detect the corresponding area based on the cost.

5. The system of claim 4, wherein the first viewing point and the second viewing point are arranged in a horizontal direction, and
   the corresponding vector searching module is configured to start, in the search area, calculating the cost from the block area whose vertical position is equal to a vertical position of the target block.

6. The system of claim 4, wherein the cost is
   a sum of absolute differences between each of pixels in the target block and each of pixels in the block area, or
   a sum of absolute values of a Discrete Cosine Transform (DCT) value of a difference between each of pixels in the target block and each of pixels in the block area.

7. The system of claim 4, wherein the image corrector comprises:
   a weight calculator configured to calculate a weight used for mixing the target block with the corresponding area based on the cost; and
   a mixing module configured to mix each pixel in the target block with each pixel in the corresponding area according to the weight.

8. The system of claim 7, wherein the weight calculator is configured to calculate the weight based on a following equation (1)

$$W = (-1/T)*C + 1 \quad \text{(if } C < T\text{)} \quad\quad (1)$$
$$0 \quad\quad \text{(else } (C \geq T))$$

where the "W" is the weight, the "T" is a predetermined constant, and the "C" is the cost.

9. The system of claim 7, wherein the mixing module is configured to mix each pixel in the target block with each pixel in the corresponding area based on a following equation (2)

$$r=(p+W*q)/(1+W) \quad\quad (2)$$

where "r" is a pixel value of an image signal after mixing, the "p" is a pixel value in the target block, the "q" is a pixel value in the corresponding area, and the "W" is the weight.

10. The system of claim 1 further comprising a memory configured to store the motion vector generated by the decoder by a block in the first image.

11. The system of claim 1 further comprising a display configured to display an image corresponding to the third image signal.

12. An image processing device comprising:
    a corresponding area detector configured to detect, based on a first image signal corresponding to a first image viewed from a first viewing point, a second image signal corresponding to a second image viewed from a second viewing point different from the first viewing point, and a motion vector for referring to the first image from the second image, a corresponding area in the second image corresponding to a target block in the first image, and a corresponding vector indicating the corresponding area of a block around a target block, and to calculate a search center vector for the target block indicative of a search center of an area over which the corresponding area is searched; and
    an image corrector configured to mix each pixel in the target block with each pixel in the corresponding area according to a degree of similarity between the target block and the corresponding area, to generate a third image signal.

13. The device of claim 12, wherein the corresponding area detector comprises:
    a search center calculator configured to calculate a search center indicative of a search center of an area over which the corresponding area is searched based on the motion vector; and
    corresponding vector searching module configured to search the corresponding area in a search area whose center is the search center.

14. The device of claim 13, wherein the search center calculator is configured to calculate the search center based on at least a part of the motion vector relating to the target block, the motion vector relating to a block around the target block, and the corresponding vector.

15. The device of claim 13, wherein the corresponding vector searching module is configured to calculate a cost indicative of a degree of similarity between the target block and a block area comprising a plurality of pixels in the search area, and to detect the corresponding area based on the cost.

16. The device of claim 15, wherein the first viewing point and the second viewing point are arranged in a horizontal direction, and the corresponding vector searching module is configured to start, in the search area, calculating the cost from the block area whose vertical position is equal to a vertical position of the target block.

17. The device of claim 15, wherein the cost is a sum of absolute differences between each of pixels in the target block and each of pixels in the block area, or a sum of absolute values of a Discrete Cosine Transform (DCT) value of a difference between each of pixels in the target block and each of pixels in the block area.

18. The device of claim 15, wherein the image corrector comprises:

a weight calculator configured to calculate a weight used for mixing the target block with the corresponding area based on the cost; and a mixing module configured to mix each pixel in the target block with each pixel in the corresponding area according to the weight.

19. The device of claim 18, wherein the weight calculator is configured to calculate the weight based on a following equation (3)

$$W = (-1/T)*C + 1 \quad \text{(if } C < T\text{)} \qquad (3)$$
$$0 \qquad \text{(else } (C \geq T))$$

where the "W" is the weight, the "T" is a predetermined constant, and the "C" is the cost.

20. An image processing method comprising:

detecting, based on a first image signal corresponding to a first image viewed from a first viewing point, a second image signal corresponding to a second image viewed from a second viewing point different from the first viewing point, and a motion vector for referring to the first image from the second image, a corresponding area in the second image corresponding to a target block in the first image, and a corresponding vector indicating the corresponding area of a block around a target block;

calculating a search center vector for the target block indicative of a search center of an area over which the corresponding area is searched; and mixing each pixel in the target block with each pixel in the corresponding area according to a degree of similarity between the target block and the corresponding area, to generate a third image signal.

21. The system of claim 1, wherein the corresponding area detector calculating a search center by calculating a search center vector based on the corresponding vector and a vector whose sign is inversed to that of the motion vector.

* * * * *